Oct. 1, 1935.  W. SCHORR  2,016,123

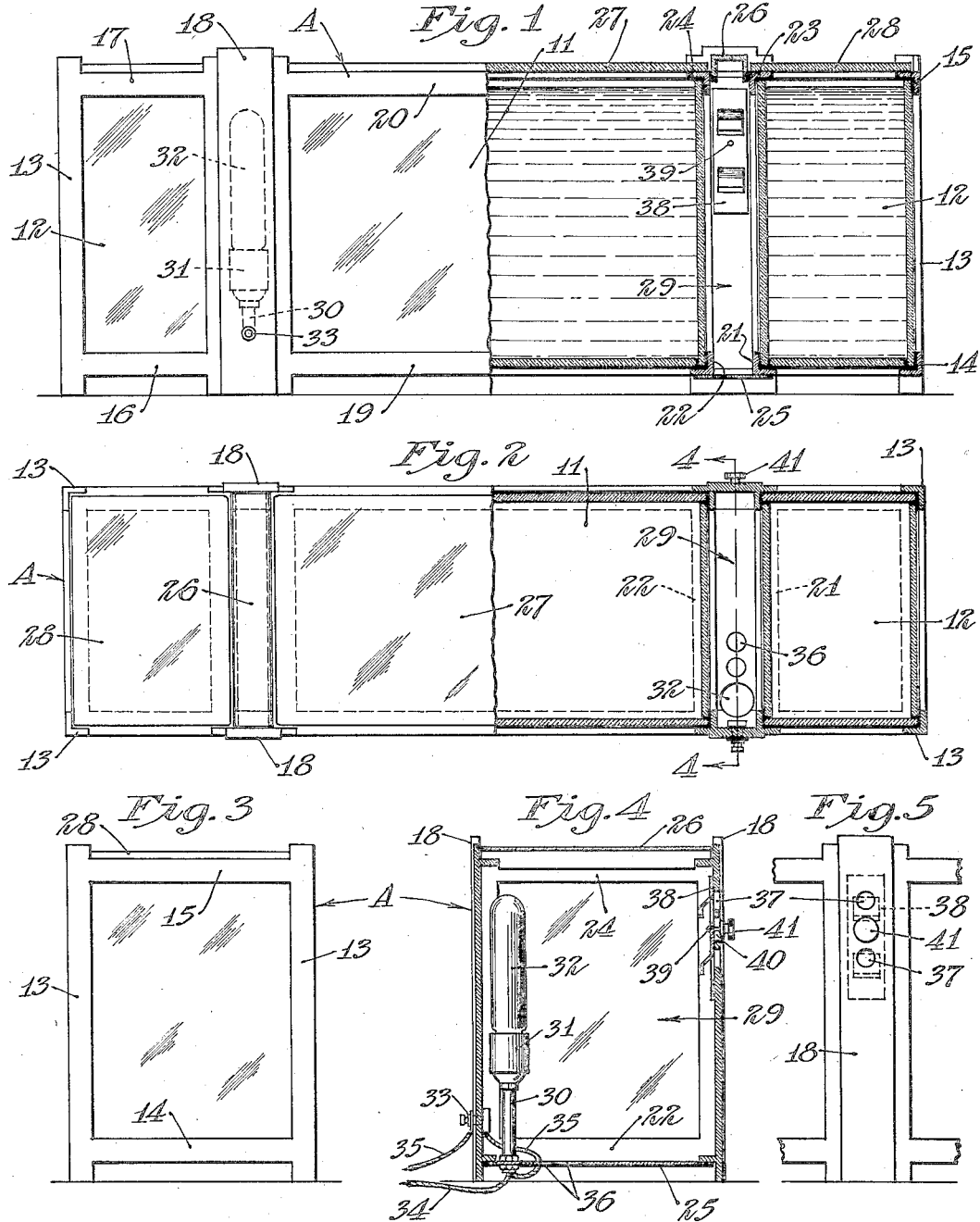

AQUARIUM

Filed March 5, 1934   2 Sheets-Sheet 2

Inventor
Wallace Schorr
By his Attorneys
Williamson & Williamson

Patented Oct. 1, 1935

2,016,123

UNITED STATES PATENT OFFICE 2,016,123

AQUARIUM

Wallace Schorr, Morningside, Minn.

Application March 5, 1934, Serial No. 714,060

2 Claims. (Cl. 119—5)

This invention relates to aquariums.

At the present time, many individuals make a hobby of keeping and breeding small tropical fish. Many of these fish bear their young alive and as these fish are cannibalistic in tendency, it is highly desirable that the young fish and breeding mothers be segregated from other fish. In aquariums containing these tropical fish, plant life is grown and this plant life prevents the fish from being viewed readily in a room lit by ordinary sunlight or lights. Also the temperature of the water in which the fish are kept should be quite high relative to the ordinary room temperature, or the fish will die. It is therefore desirable to supply means for both lighting and heating these aquariums for tropical fish.

It is the general object of this invention to provide a novel and improved aquarium of cheap and simple construction and including two or more glass tanks and novel means for both heating and lighting these tanks.

To this end, generally stated, the invention consists in the novel parts and novel combinations of parts hereinafter defined in the claims and described in the following specification, made in connection with the accompanying drawings, wherein like reference characters refer to the same or similar parts throughout the various views, and, in which, Fig. 1 is a view partly in front elevation and partly in vertical longitudinal section of an aquarium embodying the invention;

Fig. 2 is a view partly in plan and partly in horizontal section through the same aquarium;

Fig. 3 is an end view of the same;

Fig. 4 is a vertical section taken on the line 4—4 of Fig. 2 as indicated by the arrows;

Fig. 5 is a rear view of a portion of the aquarium;

Figure 6:
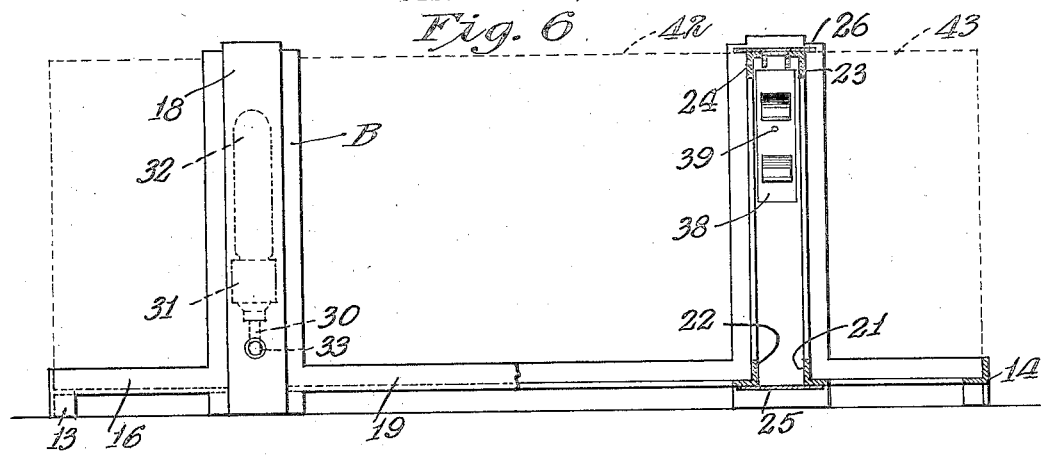
Fig. 6 is a view partly in front elevation and partly in vertical section illustrating a modified form of aquarium, the glass tanks used therewith being indicated in dotted lines.
Figure 7:
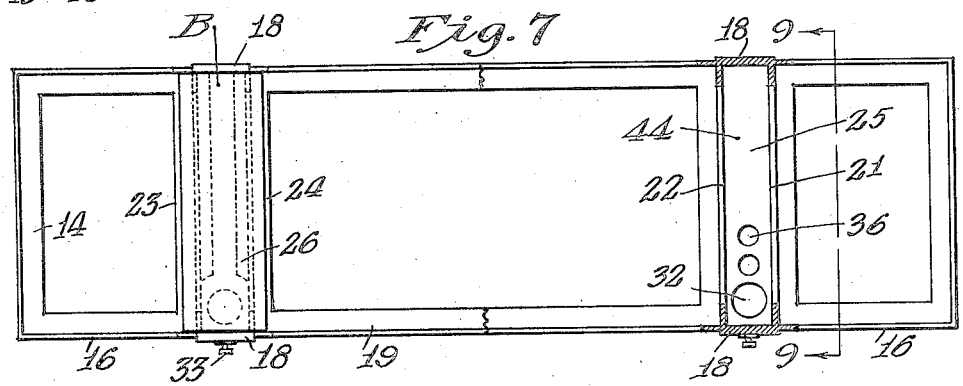
Fig. 7 is a view partly in plan and partly in horizontal section illustrating the aquarium shown in Fig. 6.
Figures 8, 9, 10:
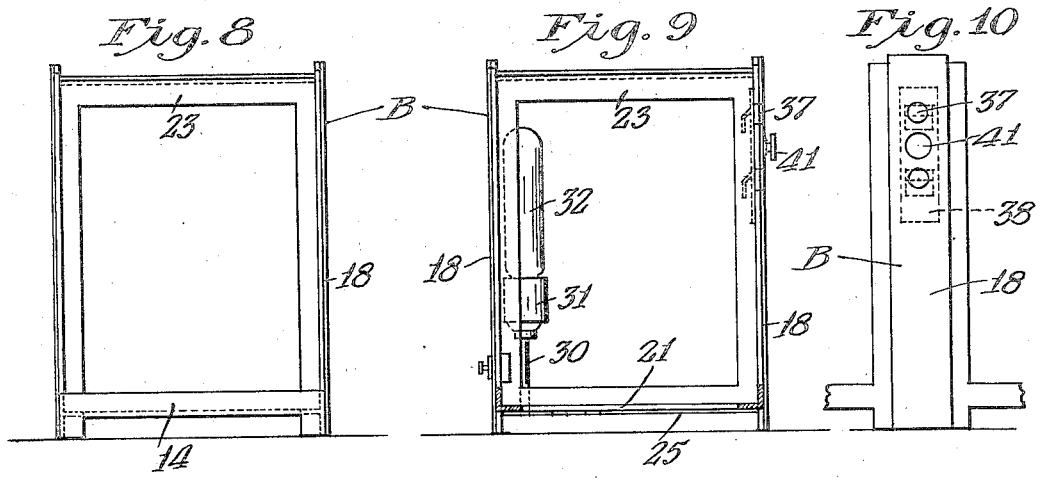
Fig. 8 is an end view of the same.
Fig. 9 is a vertical section taken on the line 9—9 of Fig. 7.
Fig. 10 is a view in rear elevation illustrating a portion of the aquarium shown in Figs. 6 to 9.

Referring first to the form of the invention illustrated in Figs. 1 to 5 inclusive, there is provided a skeleton frame designated generally by the letter A adapted to receive and hold in the embodiment illustrated three glass tanks, the central one of which may be designated by the numeral 11 and the end ones of which may be designated by the numeral 12. The frame A may be formed chiefly from angle iron, the different bars of which may be secured together as by welding, soldering or as by means of bolts or screws or the like. In the illustrated embodiment, the different bars forming the frame A are shown as being integrally connected together.

The frame A is of general oblong-shape in plan, side elevation and end elevation and it includes four corner uprights 13, the two uprights at each end of the frame being cross connected near their lower ends by angle bars 14 and being connected near their upper ends by cross angle bars 15. The cross bars 14 have lower inwardly projecting horizontal flanges and outer vertically extending flanges projecting upwardly from their horizontal flanges. The upper cross bars 15 have upper inwardly extending horizontal flanges and lower downwardly extending vertical flanges. Connected to the corner uprights 13 near their lower ends and extending longitudinally of the frame are short longitudinal angle bars 16, while connected to the corner uprights 13 near their upper ends are longitudinal angle bars 17 of a similar length to the bars 16. The bars 16 have lower horizontal inwardly extending flanges and upwardly extending vertical flanges, while the bars 17 have upper inwardly extending horizontal flanges and lower downwardly extending vertical flanges. The longitudinal bars 16 and 17 join uprights 18, each of which has spaced parallel inwardly extending vertical flanges. Lower longitudinally extending angle bars 19 extending at a level corresponding to the longitudinal bars 16, connect the uprights 18 at corresponding sides of the frame near their lower ends, while other longitudinally extending angle bars 20 connect these same uprights near their upper ends, the bars 20 being disposed at the same level as the bars 17. Bars 19 have lower inwardly projecting horizontal flanges and outer upwardly extending vertical flanges, while bars 20 have inwardly projecting upper horizontal flanges and downwardly projecting outer vertical flanges. Extending transversely of the frame between oppositely facing uprights 18 and joining these uprights near their lower and upper ends respectively near the edges thereof are spaced parallel lower cross bars 21 and 22 respectively, and upper cross bars 23 and 24 respectively. The cross bars 21 and 22 lie at a level corresponding to the longitudinal bars 16 and 19, while the cross bars 23 and 24 lie at a level corresponding to the cross bars 17 and 20. The cross bars 21 have lower horizontal flanges extending toward the ends of the frame and vertical flanges extending upwardly from the inner edges of the horizontal flanges. The cross bars 23 have upper horizontal flanges extending toward the ends of the frame and vertical flanges joining the inner edges of the horizontal flanges. The cross bars 22 have lower horizontal flanges extending toward the center of the frame and vertical flanges joining the outer edges of the horizontal flanges. The cross bars 24 have upper horizontal flanges extending toward the center of the frame and lower vertical flanges joining the outer edges of the horizontal flanges.

Secured to adjacent cross bars 21 and 22 bridging the space between the same and extending between opposite uprights 18 are plates 25, these plates being attached to the undersides of the horizontal flanges of the cross bars 21 and 22 and also being attached to inwardly extending horizontal flanges formed on the uprights 18. Channel-shaped cross bars 26 extend between upper portions of the uprights 18 and the downwardly projecting flanges of these channels make a close fit between the vertical flanges of the cross bars 23 and 24 to bridge the space between the same. The ends of the downwardly extending flanges of the channel bars 26 are notched, as best shown in Fig. 4, to loosely rest on inwardly extending flanges formed near the upper ends of the uprights 18.

The corner uprights 13 and the uprights 18 project downwardly below the bars 14, 16 and 19 to form supporting legs for the frame while they extend upwardly a short distance above the bars 15, 17 and 20 to form retaining surfaces for removable glass plates 27 and 28. The plate 27 rests on the horizontal flanges of bars 20 and 24 between the two channel bars 26, while the plates 28 rest on the horizontal flanges of the bars 15, 23 and 17 between the respective channel bars and the corner uprights 13.

The tanks 11 and 12 are open topped tanks of rectangular shape and the walls of these tanks are formed preferably by plates of glass, the different adjacent walls being secured together as by glass cement, or the like. Of course, the walls of these tanks may be integrally formed if desired. The tank 11 is supported below the glass plate 27 on the horizontal flanges of the bars 19 and 22 and the upper edges of the tank underlie the horizontal flanges of the bars 20 and 24. The vertical flanges of these various bars hold the tank 11 from sliding movement. The tanks 12 are similarly supported by the horizontal flanges of the bars 14, 16, and 21, and the upper edges of these tanks underlie the horizontal flanges of the bars 15, 17 and 23. The vertical flanges of these respective bars hold the tanks 12 from sliding movement. Of course, the plates 28 overlie the tanks 12.

With the various tanks 11 and 12 supported as described, it will be seen that adjacent ends of adjacent tanks 11 and 12 are disposed in spaced parallel relation and these ends together with the uprights 18, cross bars 21, 22, 23 and 24, plates 25 and channel bars 26 form substantially closed chambers which may be designated 29.

Mounted within the chambers 29, as on the plates 25 near the forward ends thereof, are upright tubes 30 connected to electric light sockets 31 within which electric light bulbs 32 are mounted. Mounted on the front uprights 18 are suitable electric switches 33. Pairs of electrical conductors 34 and 35, connected at their outer ends to some suitable source of electrical supply, run into the tubes 30 and are connected to the sockets 31. The conductors 35 are divided into two sections, one section of each conductor running to a switch 33 and the other section running from the switch to the tube 30. Air inlet openings 36 to the chamber 29 are provided through the plates 25 and air outlet openings 37 are provided in the rear uprights 18 near their upper ends. The outlet openings 37 are controlled by slide dampers 38 which carry studs 39 projecting through slots 40 in the rear uprights 18. Knobs 41 have screw-threaded engagement with the studs and through the medium of the knobs, the dampers may be held in desired adjusted position relative to the outlet openings 37. The plates of the dampers 38 may be made as shown with openings provided therethrough by pressing certain of the material inwardly from the general planes of the plates after cuts have been made in the plates.

With an aquarium constructed as described, there are available three tanks 11 and 12 for the fish and these tanks are held in closely assembled relation by the frame A so that fish can be readily transferred from one tank to another to segregate certain fish from others as desired. The young fish may thus be kept segregated from the adult fish so as to prevent the young fish from being eaten by the adult fish.

By turning on the switches 33, electricity will be supplied to the bulbs 32 to light the same and these bulbs located in the substantially closed chambers 29 have the double function of lighting two adjacent tanks 11 and 12, so as to permit the fish to be readily viewed and of supplying heat to the chamber 29 so as to heat the water in these two tanks. The side walls of the chambers 29 as have been described, are formed by adjacent ends of tanks 11 and 12 and heat is transmitted both by radiation and conduction from the chambers 29 to the water in the tanks. The temperature of the tanks can be regulated when the lights 32 are on by means of the dampers 38. When the dampers 38 are opened, fresh air can enter the chambers 29 through the air inlets 36 and heated air may exhaust from the chambers through the air outlets 37. The settings of the dampers 38 determine the rapidity of air circulation through the chambers 29. As the bulbs 32 are located directly behind the front uprights 18, the tanks are indirectly lit up as observed from the front of the tanks and the beams from these lights shine on the fish and other marine life held within the tanks so as to produce beautiful effects.

Referring now to the embodiment of the aquarium illustrated in Figs. 6, 7, 8, 9 and 10, there is provided an aquarium consisting of a frame B bearing a great deal of similarity to the frame A with the exception that the end posts of the frame B do not project above the lower horizontal bars 14, 16, 19, 21 and 22 of the frame and the upper horizontal bars with the exception of 23 and 24 found in the frame A are eliminated in the frame B. The tanks 42 and 43 indicated in dotted lines Fig. 6, are supported in much the same manner on the frame B that they are on the frame A and the adjacent end walls of these tanks together with front and rear uprights 18 and top and bottom cross members 23, 24 and 26 and 21, 22 and 25 respectively form substantially closed chambers 44 very similar to the chambers 29. Bulbs 32 are mounted in these chambers and the chambers are provided with air inlets 36 and damper 38 equipped air outlets 41 in similar manner to the chambers 29. The frame B is a less elaborate but cheaper and simpler construction than the frame A, but it serves the same purposes as does the frame A.

The aquarium of the invention is of cheap and simple construction and it has been found to be practical and efficient in use. It will, of course, be appreciated that it is possible to support any number of glass tanks by frames built in accordance with the present invention.

It will, of course, be understood that various changes may be made in the form, details, arrangement and proportions of the various parts without departing from the scope of the present invention.

It will of course be understood that access to the chambers 29 to get at the bulbs 35 and to clean the end walls of the tanks 11 and 12 may be had by lifting the bars 26. Similarly the upper cross bars of frame B may be raised.

What is claimed is:—

1. An aquarium comprising a skeleton frame, a pair of glass tanks supported by said frame and disposed with adjacent ends in spaced parallel relation, said frame including a pair of spaced uprights, a bottom cross member extending between the lower ends of said uprights and a top cross member extending between the upper ends of said uprights, all of which members bridge the space between the adjacent ends of the said tanks and form with the adjacent ends of said tanks a substantially closed chamber, an electric light bulb mounted within said chamber and means for supplying electricity to said bulb, said bulb acting to both light said tanks and heat the same.

2. The combination with two glass tanks, of a rectangular base frame holding said two tanks with adjacent ends of the same in spaced parallel relation, enclosing elements joining said base frame, bridging the space between the said adjacent ends of said two tanks and forming therewith a substantially closed chamber, an electric light bulb mounted within said chamber and means for supplying electricity to said bulb to both light and heat said two tanks, said chamber having an air inlet opening in its bottom and a damper controlled air outlet in spaced relation above its bottom for controlling the temperature of said tanks.

WALLACE SCHORR.